United States Patent
Rende

(10) Patent No.: US 11,476,650 B2
(45) Date of Patent: Oct. 18, 2022

(54) ELECTRICAL USER

(71) Applicant: ITALY INNOVAZIONI S.P.A., Milan (IT)

(72) Inventor: Giorgio Rende, Corigliano Calabro (IT)

(73) Assignee: ITALY INNOVAZIONI S.P.A., Milan (IT)

( * ) Notice: Subject to any disclaimer, the term of this patent is extended or adjusted under 35 U.S.C. 154(b) by 58 days.

(21) Appl. No.: 17/053,695

(22) PCT Filed: Apr. 24, 2019

(86) PCT No.: PCT/IB2019/053365
§ 371 (c)(1),
(2) Date: Nov. 6, 2020

(87) PCT Pub. No.: WO2019/220240
PCT Pub. Date: Nov. 21, 2019

(65) Prior Publication Data
US 2021/0083462 A1    Mar. 18, 2021

(30) Foreign Application Priority Data

May 15, 2018   (IT) .................. 102018000005401

(51) Int. Cl.
*H02G 3/00* (2006.01)
*H02G 3/08* (2006.01)
*H02G 3/12* (2006.01)

(52) U.S. Cl.
CPC ............... *H02G 3/081* (2013.01); *H02G 3/12* (2013.01)

(58) Field of Classification Search
CPC .................................. H02G 3/081; H02G 3/12
See application file for complete search history.

(56) References Cited

U.S. PATENT DOCUMENTS

| | | |
|---|---|---|
| 5,495,402 A | 2/1996 | Houssian |
| 5,963,595 A | 10/1999 | Graham et al. |
| 6,246,718 B1 | 6/2001 | Graham et al. |
| 7,597,292 B2 | 10/2009 | Kayumi |
| 7,817,407 B2 | 10/2010 | Tanaka |
| 8,325,057 B2 | 12/2012 | Salter |
| 8,518,569 B2 | 8/2013 | Murphy et al. |
| 8,532,827 B2 | 9/2013 | Stefanski et al. |
| 8,558,179 B2 | 10/2013 | Filson et al. |
| 8,560,128 B2 | 10/2013 | Ruff et al. |
| 8,766,194 B2 | 7/2014 | Filson et al. |
| 8,942,853 B2 | 1/2015 | Stefanski et al. |
| 8,998,102 B2 | 4/2015 | Fadell et al. |
| 9,121,623 B2 | 9/2015 | Filson et al. |
| 9,127,853 B2 | 9/2015 | Filson et al. |
| 9,171,458 B2 | 10/2015 | Salter |

(Continued)

FOREIGN PATENT DOCUMENTS

| | | |
|---|---|---|
| CH | 701228 A1 | 12/2010 |
| CN | 1306696 A | 8/2001 |

(Continued)

*Primary Examiner* — Pete T Lee
(74) *Attorney, Agent, or Firm* — Pearne & Gordon LLP

(57) ABSTRACT

An electrical user comprising: —a recessed box (7); —a frame (2) applied to the box (7); —a cover (3) for covering said frame (2). The cover (3) is removable from the frame (2) and comprises: i) a rechargeable electric battery (32); ii) an electrical device (31).

9 Claims, 5 Drawing Sheets

(56) References Cited

U.S. PATENT DOCUMENTS

| | | |
|---|---|---|
| 9,175,868 B2 | 11/2015 | Fadell et al. |
| 9,194,598 B2 | 11/2015 | Fadell et al. |
| 9,234,668 B2 | 1/2016 | Fadell et al. |
| 9,234,669 B2 | 1/2016 | Filson et al. |
| 9,261,289 B2 | 2/2016 | Ruff et al. |
| 9,291,359 B2 | 3/2016 | Fadell et al. |
| 9,535,589 B2 | 1/2017 | Fadell et al. |
| 9,558,655 B2 | 1/2017 | Salter |
| 9,720,585 B2 | 8/2017 | Fadell et al. |
| 9,740,385 B2 | 8/2017 | Fadell et al. |
| 9,857,961 B2 | 1/2018 | Fadell et al. |
| 9,910,577 B2 | 3/2018 | Stefanski et al. |
| D819,460 S | 6/2018 | Fadell et al. |
| 10,048,852 B2 | 8/2018 | Fadell et al. |
| 10,237,954 B2 | 3/2019 | Dimberg et al. |
| 10,481,780 B2 | 11/2019 | Ruff et al. |
| 10,548,205 B2 | 1/2020 | Dimberg et al. |
| 10,678,416 B2 | 6/2020 | Fadell et al. |
| 10,721,811 B2 | 7/2020 | Dimberg et al. |
| 2006/0185879 A1 | 8/2006 | Kayumi |
| 2009/0040693 A1 | 2/2009 | Tanaka |
| 2010/0060479 A1 | 3/2010 | Salter |
| 2011/0019353 A1 | 1/2011 | Tanaka |
| 2011/0210954 A1 | 9/2011 | Murphy et al. |
| 2013/0099009 A1 | 4/2013 | Filson et al. |
| 2013/0099010 A1 | 4/2013 | Filson et al. |
| 2013/0099124 A1 | 4/2013 | Filson et al. |
| 2013/0103204 A1 | 4/2013 | Stefanski et al. |
| 2013/0103207 A1 | 4/2013 | Ruff et al. |
| 2013/0173064 A1 | 7/2013 | Fadell et al. |
| 2013/0187788 A1 | 7/2013 | Salter |
| 2013/0226354 A9 | 8/2013 | Ruff |
| 2014/0005839 A1 | 1/2014 | Stefanski et al. |
| 2014/0027645 A1 | 1/2014 | Filson et al. |
| 2014/0028551 A1 | 1/2014 | Ruff et al. |
| 2014/0144667 A1 | 5/2014 | Debartolo, Jr. et al. |
| 2014/0345845 A1 | 11/2014 | Fadell et al. |
| 2014/0346241 A1 | 11/2014 | Fadell et al. |
| 2014/0346362 A1 | 11/2014 | Filson et al. |
| 2014/0358293 A1 | 12/2014 | Fadell et al. |
| 2014/0358297 A1 | 12/2014 | Fadell et al. |
| 2014/0367475 A1 | 12/2014 | Fadell et al. |
| 2015/0077021 A1* | 3/2015 | Smith ............... H01H 9/54 |
| | | 315/362 |
| 2015/0153060 A1 | 6/2015 | Stefanski et al. |
| 2015/0204691 A1 | 7/2015 | Salter |
| 2015/0330658 A1 | 11/2015 | Filson et al. |
| 2015/0330660 A1 | 11/2015 | Filson et al. |
| 2016/0047569 A1 | 2/2016 | Fadell et al. |
| 2016/0069583 A1 | 3/2016 | Fadell et al. |
| 2016/0162008 A1 | 6/2016 | Ruff |
| 2016/0170626 A1 | 6/2016 | Fadell et al. |
| 2017/0115649 A1* | 4/2017 | Richardson ......... H02G 3/081 |
| 2017/0344243 A1 | 11/2017 | Fadell et al. |
| 2017/0354023 A1 | 12/2017 | Dimberg et al. |
| 2018/0032041 A1 | 2/2018 | Barbosa Sirgado |
| 2018/0049300 A1 | 2/2018 | Recker et al. |
| 2018/0129404 A1 | 5/2018 | Fadell et al. |
| 2018/0181291 A1 | 6/2018 | Filson et al. |
| 2018/0263098 A1* | 9/2018 | Recker ............... H05B 47/11 |
| 2019/0074676 A1* | 3/2019 | Beghelli ............. H05B 45/18 |
| 2019/0109443 A1* | 4/2019 | Bhate ................ F24F 11/89 |
| 2019/0208608 A1 | 7/2019 | Dimberg et al. |
| 2020/0128656 A1 | 4/2020 | Dimberg et al. |
| 2020/0096816 A1 | 9/2020 | Dimberg et al. |

FOREIGN PATENT DOCUMENTS

| | | |
|---|---|---|
| CN | 2489497 Y | 5/2002 |
| CN | 1810544 A | 8/2006 |
| CN | 101364126 A | 2/2009 |
| CN | 101595463 A | 12/2009 |
| CN | 201422025 Y | 3/2010 |
| CN | 101765758 A | 6/2010 |
| CN | 102195011 A | 9/2011 |
| CN | 202260515 U | 5/2012 |
| CN | 202495792 U | 10/2012 |
| CN | 203151149 U | 8/2013 |
| CN | 103890667 A | 6/2014 |
| CN | 104242406 A | 12/2014 |
| CN | 207010848 U | 2/2018 |
| CN | 111554533 A | 8/2020 |
| EP | 3258326 | 12/2017 |
| EP | 2863483 B1 | 8/2019 |
| WO | 0024078 A1 | 4/2000 |

\* cited by examiner

ELECTRICAL USER

TECHNICAL FIELD

The present invention relates to an electrical user.

PRIOR ART

Electronic devices that allow domotic control are known. They comprise recessed wall displays that define a user interface through which the user can interact with domestic applications.

OBJECT OF THE INVENTION

The object of the present invention is to propose an electrical user which allows the utmost flexibility of use. A further object of the present invention is to utilise the infrastructures partially present in buildings to facilitate the installation of domotic controls.

The stated technical task and specified objects are substantially achieved by an electrical user comprising the technical features set forth in one or more of the appended claims.

BRIEF DESCRIPTION OF THE DRAWINGS

Further characteristics and advantages of the present invention will become more apparent from the following indicative and therefore non-limiting description of an electrical user as illustrated in the appended drawings, in which.

DETAILED DESCRIPTION OF PREFERRED EMBODIMENTS OF THE INVENTION

The present invention relates to a recessed electrical user. Such electrical user comprises:

a frame 2;

a cover 3 for covering the frame 2.

Figure 1:
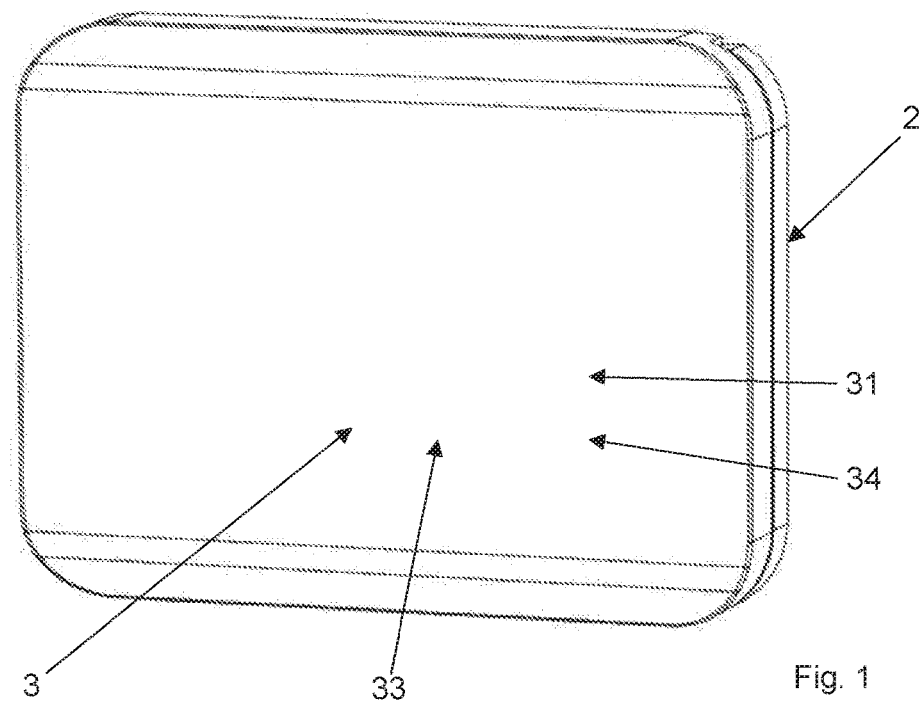
FIGS. 1 and 2 show a detail of an electrical user according to the present invention in two different configurations.
Figure 2:
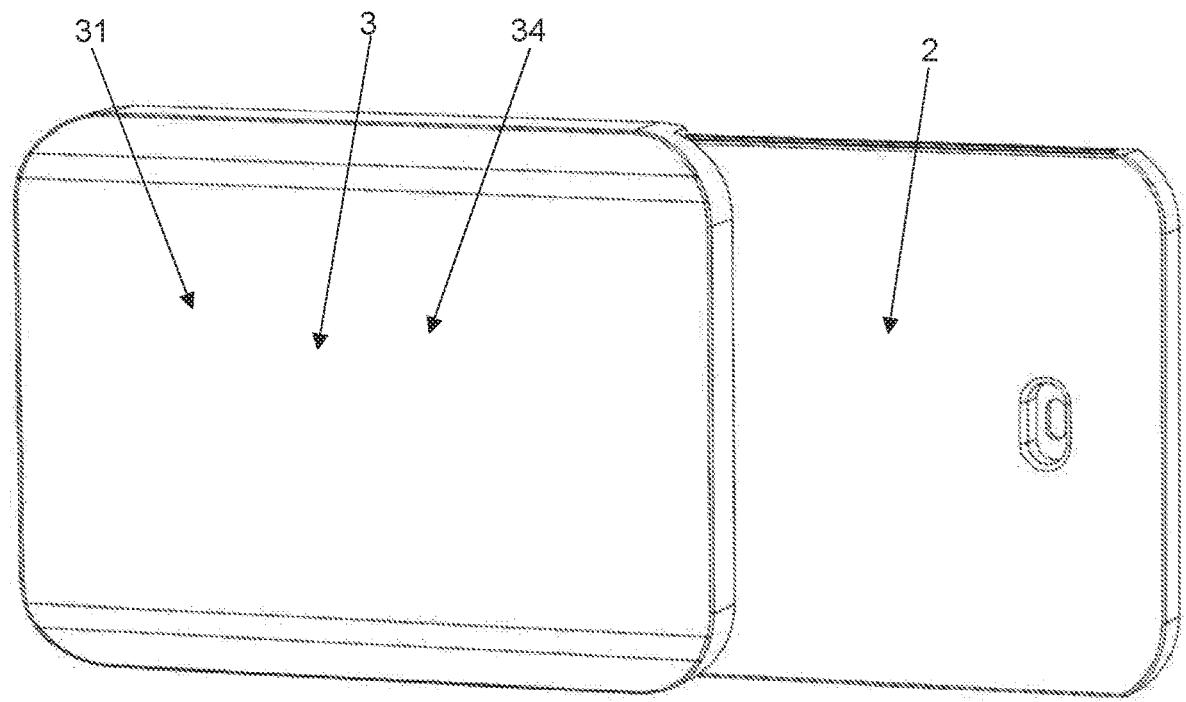

Suitably the electrical user comprises a recessed electrical box 7 (typically which can be recessed in a wall or in a portion of wall). The frame 2 is applicable to (or better engageable in) the electrical box 7. The frame 2 occludes an opening of the electrical box 7. The frame 2 could comprise a closure plate, as exemplified in FIG. 2. The box 7 is connected to the electricity mains.

The cover 3 is movable at least between an open configuration and a closed configuration. In the open configuration the cover 3 allows access to the frame 2 behind. In the closed configuration the cover 3 hides the frame 2 behind it more than in the open configuration.

The cover 3 comprises an electrical device 31. Electrical device 31 is intended as a device that uses electricity for its own operation. Any electronic device is therefore also intended.

Suitably the electrical user comprises a transformer 6. This transformer 6 is operatively placed upstream of the electrical device 31. This transformer 6 is assembled to the frame 2 or to the box 7.

The cover 3 comprises wireless data transmission and/or reception means intended to interact with other electronic equipment. Therefore, even at a distance from the frame 2, its operation is not compromised. The wireless means are essential in order to interact with other devices and for domotic control.

Advantageously, the cover 3 is completely removable from the frame 2. The cover 3 is portable. Therefore, the user can remove the cover 3 from the frame 2 and use the electrical device 3 even at a distance from the frame 2. In this regard, the cover 3 comprises an electric battery for powering said electrical device 31.

In a configuration wherein the cover 3 is applied to the frame 2, the cover 3 is powered by an electrical grid. In a configuration wherein the cover 3 is completely removed from the frame 2, the electric battery powers the electric device 31.

The battery serves the function of a buffer battery. The battery ensures correct operation even when the cover 3 is completely removed from the frame 2 and therefore is not powered by an electricity mains. Such battery is appropriately of the rechargeable type. The battery is charged by exploiting the electricity mains which powers the box 7. This takes place in at least one predetermined configuration in which the cover 3 is connected to the frame 2. Preferably this occurs in any configuration in which the cover 3 is connected to the frame 2.

The electrical device 31 placed in the cover 3, at least in a configuration in which it is constrained to the frame 2, is in fact electrically powered. Suitably this takes place through at least one electrical contact 21 afforded in the frame 2 (possibly through the interposition of the electric battery).

The frame 2 also comprises a guide means 22 for guiding the cover 3. The guide means 22 allow the sliding of the cover 3. Preferably, the sliding could be lateral or between the top and the bottom. Typically this sliding is translational. In the preferred solution the cover 3 is completely removable from the frame 2 at the end of a lateral sliding stroke.

The cover 3 could comprise a strip 310 of electrically conductive material; this strip 310 is in electric communication with said contact 21 in a plurality of configurations corresponding to different degrees of opening of said cover 3.

The strip 310, in combination with at least the electrical contact 21 afforded in the frame 2, defines a lateral sliding electrical contact for at least a portion of the sliding of the cover 3. This portion affects at least 60% of the stroke of the cover 3 from the closed configuration to that of complete opening. This complete opening configuration is defined by a stroke end. Further extracting the cover 3 results in the removal of the cover from the frame 2. This could occur, for example deforming (at least in part in an elastic way) the end stroke (which could be for example an abutment made of plastic material).

The cover 3 is not necessarily slidable. For example, in an alternative solution the cover 3 could be a door. In this case, the cover 3 could have means for coupling and uncoupling to the frame.

Suitably the cover 3 comprises a user interface 34 of said electrical device 31. Suitably the user interface 34 is afforded on a front surface 33 of the cover 3. This user interface 34 could comprise a display, for example with touch screen controls.

In FIGS. 1, 2, 6-10 the front surface 33 is entirely occupied (or in any case for at least 70%) by the display.

The electrical device 31 can be of various types. For example it could comprise a domotic control device.

The device 31 could be a speaker. This is adapted to interface in a wireless mode with an input signal.

Figure 5:
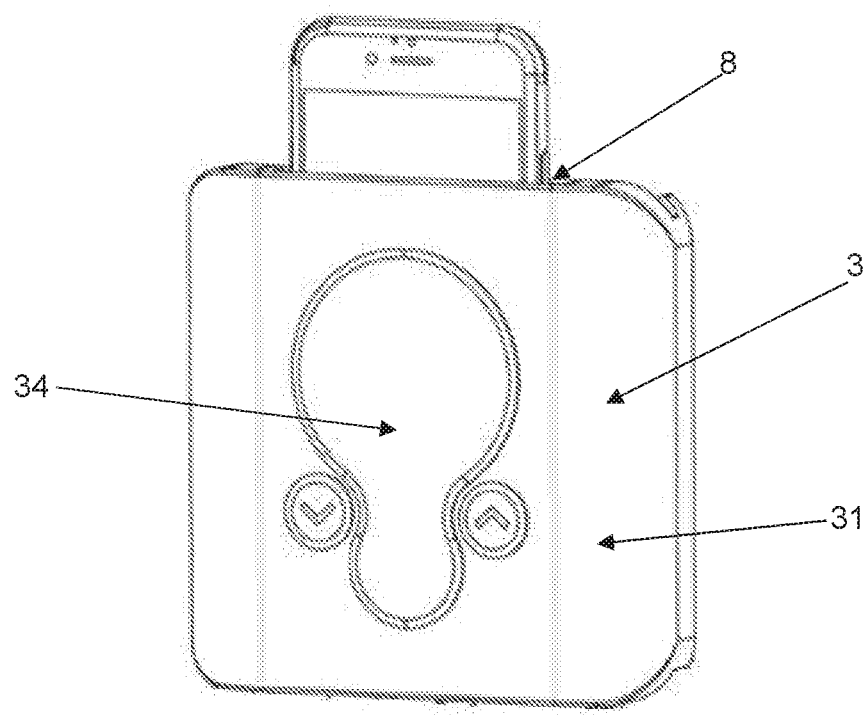
Figure 6:
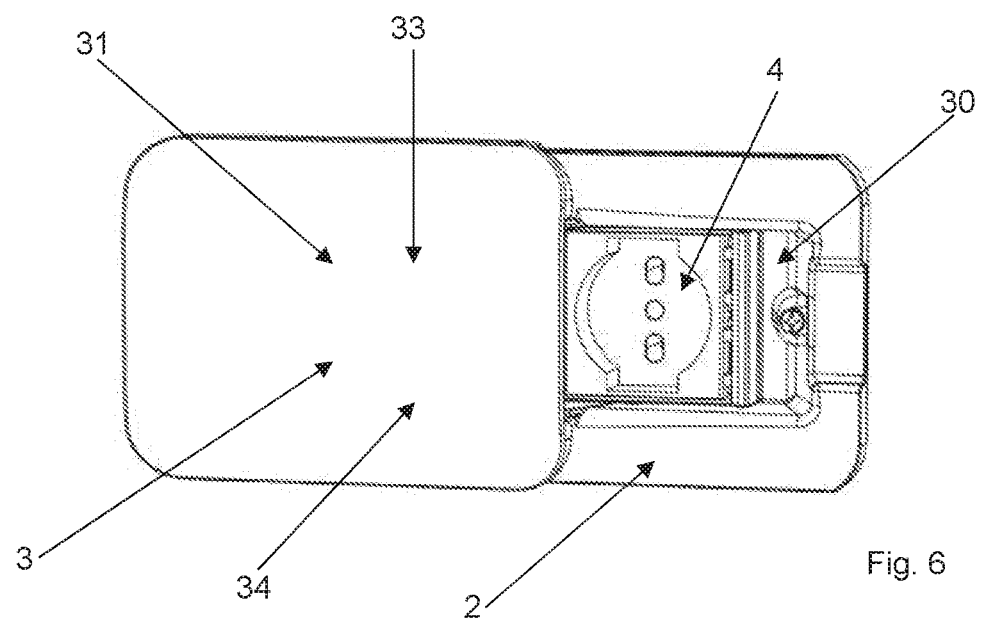
FIGS. 6 and 10 show a further constructive solution of an electrical user which is alternative to that of FIGS. 1 and 2.
Figure 7:
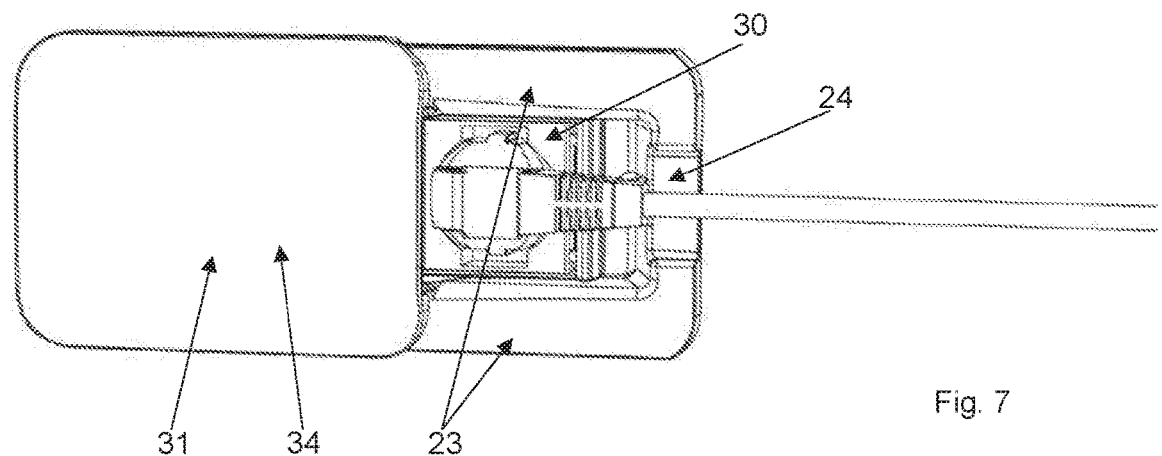
FIGS. 7-9 show the electrical user of FIGS. 6 and 10 in a configuration in which an electric plug is inserted.
Figure 8:
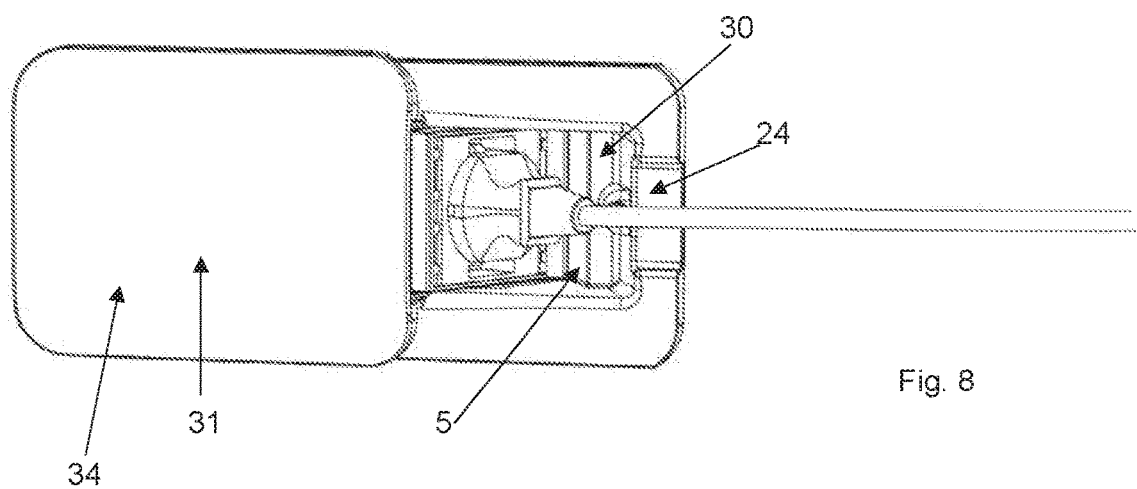

As exemplified in FIG. 5, the device 31 could be a charging device (wireless or otherwise) for phones/tablets. In this regard, the device 31 can define a pocket 8 for at least the partial insertion of the telephone/tablet for wireless charging.

As exemplified still in FIG. 5, the device 31 could be a thermostat. In this regard, the front surface has buttons and the display visible.

In this case the device 31 could comprise a temperature sensor by means of which the above-mentioned domotic control device is able to operate temperature adjustment means (for example a boiler, a heat pump, cooling systems, etc.).

Figure 3:
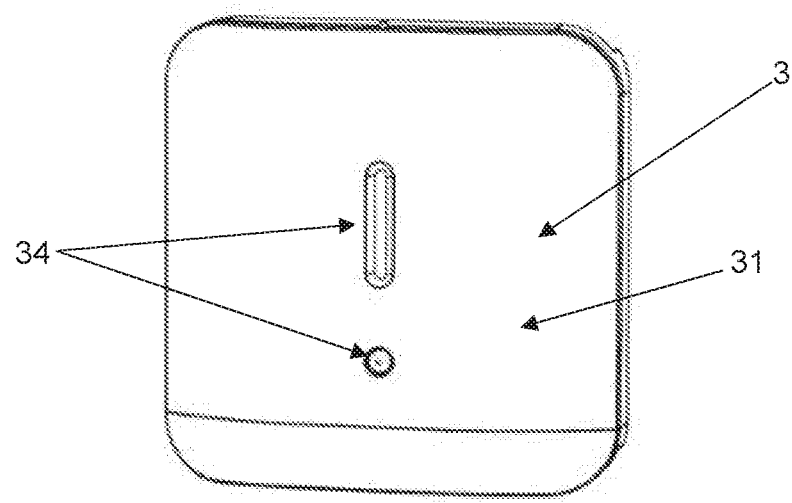
FIGS. 3-5 show a detail of an electrical user according to the present invention.

As exemplified in FIG. 3, the device 31 can comprise a fragrance diffuser for deodorising environments. For example, at predetermined or adjustable time intervals, the device 31 releases a fragrant jet. In an alternative solution it could release, instead of a deodorising fragrance, pesticides (for example, to counteract the presence of mosquitoes in an environment).

Figure 4:
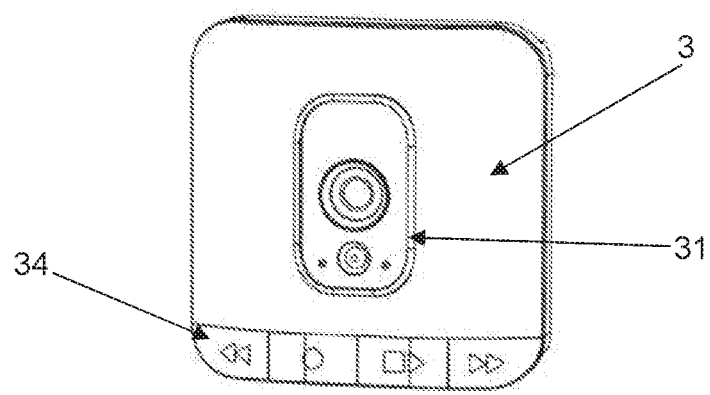

As exemplified in FIG. 4, the device 31 could also be a surveillance system. This surveillance system could be of various types. For example it could have anti-theft purposes. Such a surveillance system could however have surveillance functions to monitor an infant, an elderly person, a person who does not feel good, etc. In this regard, the monitoring system could comprise a camera and/or a microphone. The surveillance system can transmit data in a wireless mode, such as to a mobile phone. In addition or as an alternative, it could record such data in a memory.

In a further solution, the device 31 could comprise electrical current consumption detection means (also known as flow meter) or of other users. Therefore, this would make it possible to detect the current consumption associated with the electrical socket 4 or with a group of electrical sockets or an entire building.

The device 31 could be an apparatus that allows telephone communications. It could be a cordless or replicate on its display one or more functions of a mobile phone or a tablet.

Suitably the user can comprise at least one electric power/data transmission socket 4 applied to the frame 2, this socket 4 being concealed. The socket 4 is an electrical outlet. It could also be a USB socket, HDMI socket, of via coaxial cable, etc. The socket 4 is connected to the electricity mains.

Advantageously, the socket 4 can be assembled to the frame 2; in an alternative configuration it could be at least partly integrated in a single body in the frame 2.

Figure 9:
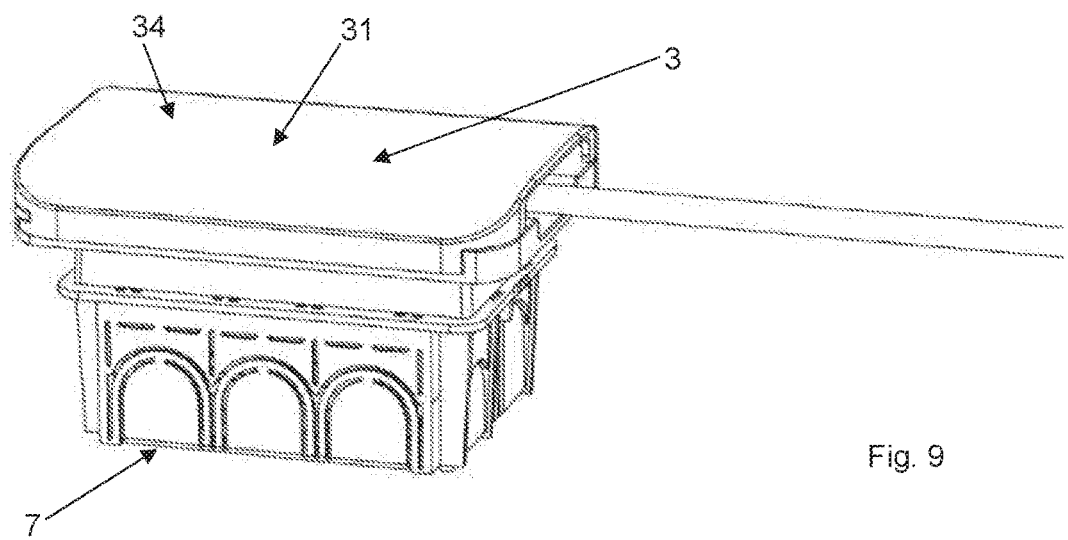
Figure 10:
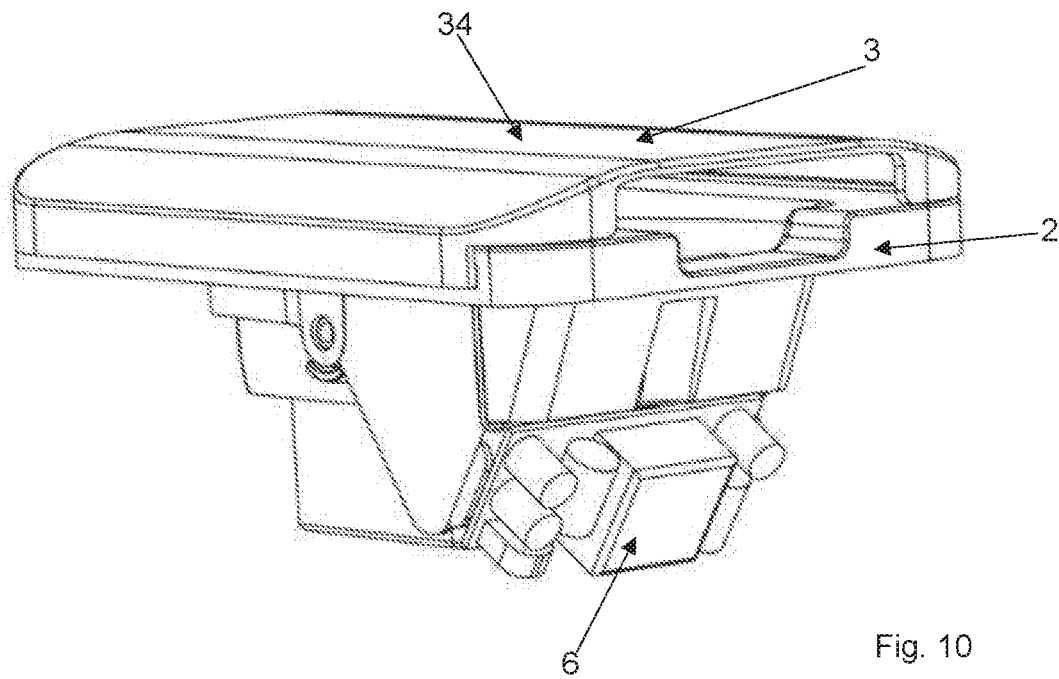
Figure 11:
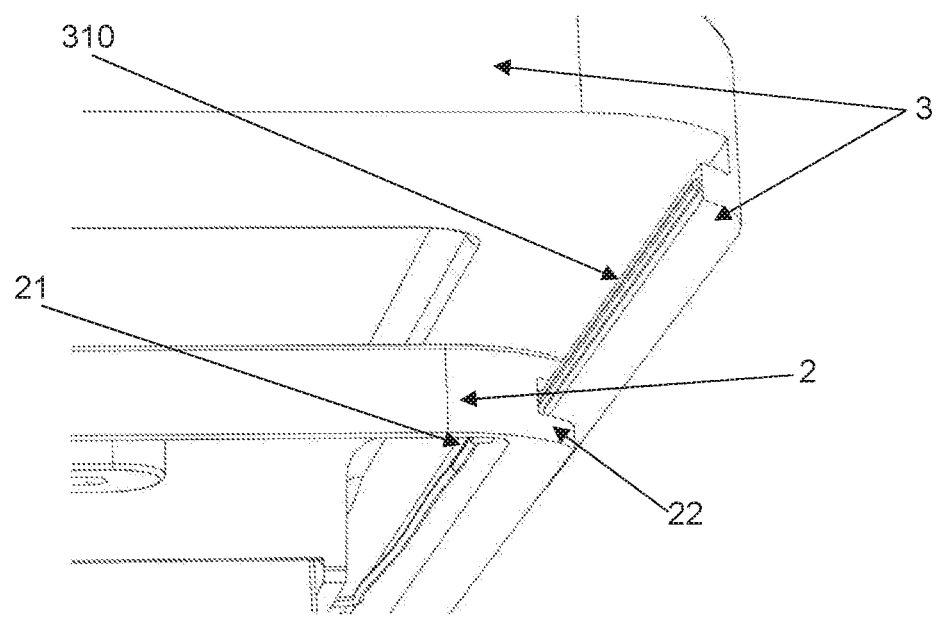
FIG. 11 shows a detail of an electrical user according to the present invention.

The socket 4 is at least partially recessed in the electrical box 7. In FIG. 9 the electrical box 7 is shown in combination with the socket 4, but in an alternative solution the presence of the box 7 is not necessarily bound to the presence of a concealed socket 4.

Suitably the cover 3 in the open configuration uncovers the socket 4, making it visible from the outside. In the closed configuration, the cover 3 typically hides the socket 4 behind. In the closed configuration a housing 30 is identified between the frame 2 and the cover 3; in the closed configuration the housing 30 is adapted to house an electric plug connected to the socket 4. The plug is illustrated in FIGS. 3 and 4 inserted in the socket 4 (in these figures, the cover 3 is open to allow a view of the plug behind). Advantageously, the frame 2 can comprise a cornice 23. The cornice 23 suitably surrounds an access opening to said housing 30. The cornice 23 comprises a groove 24 suitable to allow/facilitate the passage of an electric cable (this cable is foreign to the electrical user, but is precisely the appliance that is connected to the socket 4). The groove 24 is important in that it allows the passage of the electric cable also in the closed configuration of the cover 3.

Advantageously, the frame 2 comprises tilting means 5 which make it possible to orient the socket 4. In particular, the tilting means 5 can assume a configuration in which the holes of the socket 4 which are suitable for the insertion of a plug lie in combination on a same plane which is substantially parallel to the cover 3 in the closed configuration (see FIG. 3; this arrangement allows the housing of German-type plugs). Furthermore, the tilting means 5 assume a configuration in which they are oriented towards the groove 24 to facilitate the exit of the electric cable of the plug that is inserted in the socket 4 (see FIG. 4; this facilitates the housing of an Italian-type plug or in any case one in which the contacts of the plug and the terminal portion of the electric cable that inserts in the plug extend along the same direction).

The object of the present invention is also a system comprising:
  an electrical user having one or more of the characteristics described above;
  at least one additional electrical box and an additional frame applied to the additional electrical box. This additional electrical box could be that originally destined to an electrical socket or to a current switch.

The cover 3 of the electrical user is applicable to the additional frame and is electrically powered by the additional electrical box in a configuration in which it is applied to the additional frame.

The present invention achieves important advantages.

Firstly, it makes it possible to extend the operation of conventional power boxes, enriching them with new features and optimising the arrangement of components. In particular, the cover 3 constitutes an object that can be exploited for new features. Considering it is located at an electrical box, there are no problems housing devices that require a power supply.

In addition, the cover 3 can be removable. The user can thus carry it with him as he moves inside the building and use it as a domotic control device (to turn on lights, open blinds, turn on the heater, start the dishwasher, etc.). Furthermore, within a building there are a great number of sockets distributed in various areas. Thus the cover 3 can be moved from one room to another and inserted into prearranged frames present in the various environments (in order to avoid draining the buffer battery).

The invention as it is conceived is susceptible to numerous modifications and variations, all falling within the scope of the inventive concept characterising it. Furthermore, all the details can be replaced with other technically-equivalent elements. In practice, all the materials used, as well as the dimensions, can be any according to requirements.

The invention claimed is:
1. An electrical user comprising:
  a recessed box (7);
  a frame (2) applied to the box (7);
  a cover (3) for covering said frame (2);

characterised in that the cover (3) is removable from the frame (2) and comprises:
i) a rechargeable electric battery (32);
ii) an electrical device (31);
the frame (2) comprises a guide means (22) for guiding the cover (3), said guide means (22) allowing the sliding of the cover (3); the sliding being lateral or between the top and the bottom.

2. The user according to claim 1, characterised in that in a configuration in which the cover (3) is applied to the frame (2) the cover (3) is powered by an electrical grid; in a configuration in which the cover (3) is completely removed from the frame (2) the electric battery (32) powers the electrical device (31).

3. The user according to claim 1, characterised in that it comprises an electrical transformer (6) placed upstream of the electrical device (31).

4. The user according to claim 1, characterised in that the cover (3) comprises a wireless data transmission and/or reception means intended to interact with other electronic apparatuses.

5. The user according to claim 1, characterised in that said frame (2) occludes the recessed box (7); the cover (3) being movable at least between an open configuration in which it allows access to the frame (2) behind it and a closed configuration in which it hides the frame (2) behind it more than in the open configuration.

6. The user according to claim 1, characterised in that the electrical device (31) placed in the cover (3), at least in a configuration in which it is constrained to the frame (2), is electrically powered through at least one electrical contact (21) afforded in the frame (2).

7. The user according to claim 1, characterised in that said cover (3) comprises a front surface (33) on which a user interface (34) of said electrical device (31) is afforded.

8. The user according to claim 1, characterised in that said electrical device (31) comprises a domotic control device or a speaker or a wireless charging device for telephones/tablets or a fragrance/pesticide diffuser or a thermostat or a surveillance system or an electrical current consumption detection means.

9. A system comprising:
an electrical user according to claim 1;
at least one additional electrical box and an additional frame applied to the additional electrical box;
the cover (3) from the electrical user being applicable to the additional frame and electrically powered by the additional electrical box in a configuration in which it is applied to the additional frame.

* * * * *